United States Patent
Tapert et al.

[15] 3,665,798
[45] May 30, 1972

[54] TAPE SEVERING DEVICE

[72] Inventors: Thomas J. Tapert, Birmingham; James H. Current, Hazel Park, both of Mich.

[73] Assignee: Apex Electrophysics, Inc., Troy, Mich.

[22] Filed: Nov. 2, 1970

[21] Appl. No.: 85,856

[52] U.S. Cl. ................................. 83/575, 83/568, 83/589, 83/601, 83/679
[51] Int. Cl. .................................................. B26d 5/08
[58] Field of Search ............... 83/575, 568, 566, 589, 679, 83/633, 614, 601

[56] References Cited

UNITED STATES PATENTS

| | | | |
|---|---|---|---|
| 2,881,833 | 4/1959 | Hoffee | 83/575 |
| 2,282,200 | 5/1942 | Neuman | 83/568 X |
| 383,252 | 5/1888 | Rothe | 83/633 X |
| 2,542,465 | 2/1951 | Blanchard | 83/614 X |

Primary Examiner—James M. Meister
Attorney—Cullen, Settle, Sloman & Cantor

[57] ABSTRACT

Tape cutting means comprising a stationary cutting edge and a movable anvil, particularly useful in severing sound recording and sound playback tape of the type commonly used in cassettes and cartridges, characterized by the fact that the cutting edge is one of 12 edges of a cube which may be mounted in one of several positions to present any one of its 12 edges to the anvil for tape severance.

3 Claims, 4 Drawing Figures

Patented May 30, 1972
3,665,798
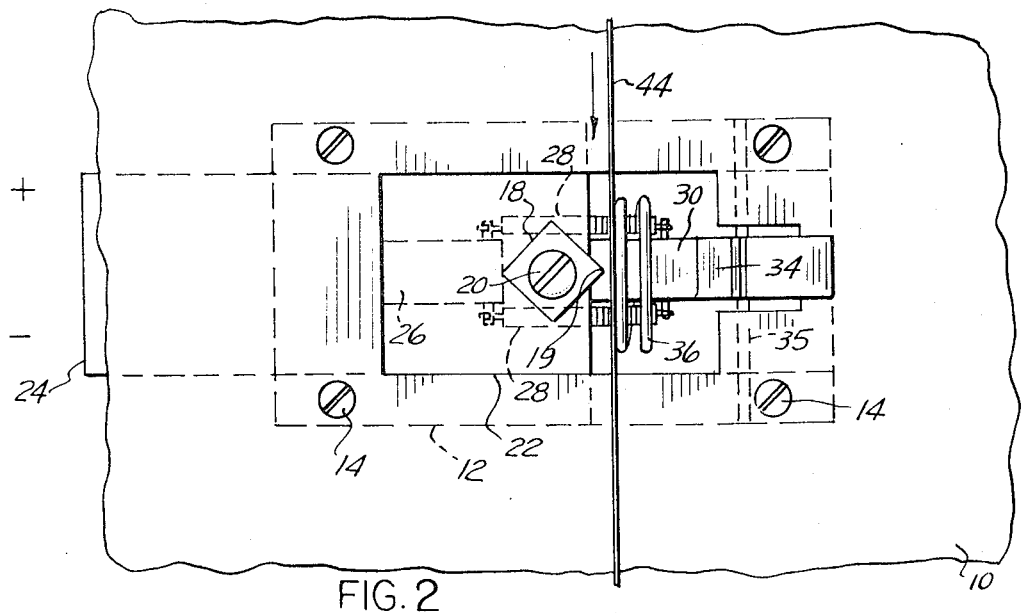
FIG. 2
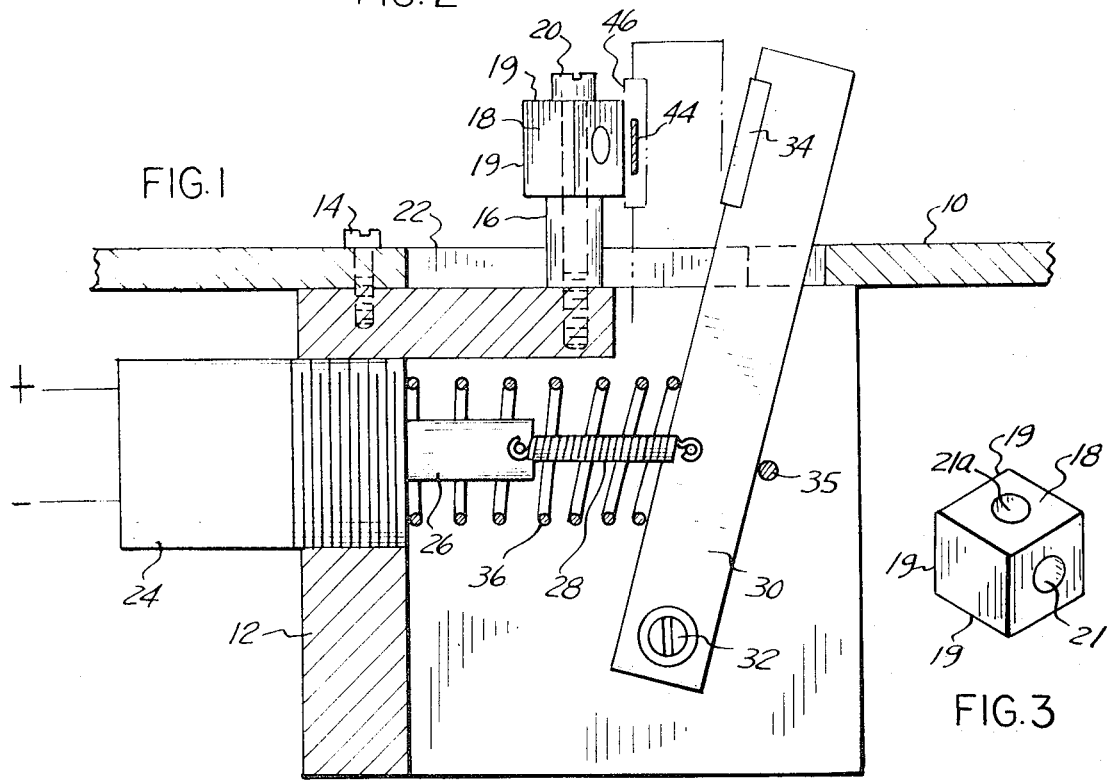
FIG. 1
FIG. 3
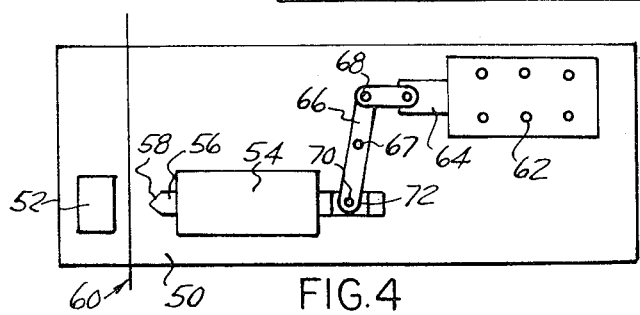
FIG. 4
INVENTORS
THOMAS J. TAPERT
JAMES H. CURRENT
BY Cullen, Settle, Sloman & Cantor
ATTORNEYS

3,665,798

TAPE SEVERING DEVICE

GENERAL DESCRIPTION

This application discloses a novel tape severing or tape cutting means particularly useful in severing or cutting tape commonly used for sound recording and sound playback, and often mounted in cassetts or cartridges.

One object of the present invention is to provide a novel and simple cutting means.

A second object is to provide a novel cutting edge means, characterized by the cutting edge being one of 12 edges of a cube which may be mounted in one of several positions to present any one of its 12 edges as desired to a movable anvil for tape cutting.

One embodiment of the invention has been disclosed in the appended drawing. In this drawing;

FIG. 1 is a vertical section view of the apparatus as a whole;

FIG. 2 is a top plan view of FIG. 1 with parts omitted for clarity;

FIG. 3 shows a cube form of cutting edge means;

FIG. 4 is a plan view of a modification.

DETAILED DESCRIPTION

Referring to the drawings it will be seen that FIG. 1 shows a table 10 which is above and which mounts a support 12 by means of supporting screws 14.

Support 12 mounts a spacer post 16 and a cutting edge means 18 in the form of a cube as shown in FIG. 3. Preferably of a hard cutting material, such as tungsten carbide, with 12 cutting edges 19. The mounting of the cutting edge means 18 is completed by the use of a screw bolt 20, with the table having a slot 22 through which passes the post 16.

The cutting edge means or cube 18 is provided with two holes 12 and 21a which enable the cube to be mounted by the bolt 20 in a manner to present any one of its 12 edges 19 to an anvil later to be described so that 12 cutting edges are available for use one after another as one becomes dull, and with a very simple adjustment being all that is required to shift the cube 18 and present another edge 19 to replace a dulled edge 19.

Support 12 mounts an actuating means of solenoid 24 whose plunger 26 is connected to coil springs 28 in turn connected to a vertically mounted horizontally movable anvil bar 30 whose lower end is pivotally mounted on support 12 by a pivot pin 32 and whose upper end projects through slot 22 of table 10 and is provided with an anvil insert 34 of any desired anvil forming substance, such as tungsten carbide.

Anvil bar 30 is biased clockwise on pivot 32 to a stop 35 by a strong spring 36 positioned between the casing of solenoid 24 and the lower end of anvil bar 30, above pivot 32.

The tape being cut is shown at 44 and by schematically shown support means 46 is passed horizontally across the cutting edge 19 but spaced from it as shown with the tape being edgewise as it moves along and across the cutting edge 19.

It will be seen that the cutting means as a whole is of extremely simple construction and rather inexpensive to produce. Properly timed impulses on the solenoid 24 cause the anvil bar 30 to move counterclockwise and press the tape 44 against the cutting edge 19 that happens to be in position to do the cutting. Because of the spring 28 connecting the plunger 26 to the anvil bar 30, and the lever ratio of the anvil bar itself, a sudden and forceful and very rapid movement of the anvil insert 34 to the tape and to the cutting edge 19 is accomplished when the solenoid is energized at properly timed intervals. The de-energizing of the solenoid permits the strong spring 36 to move the anvil bar 30 away from the tape 44 and from the cutting edge 19 quickly and effectively, so that the tape can advance for the next cut to be producted in it.

The convenience and simplicity of the cube form of cutting edge means and its uses will also be clear from the foregoing.

MODIFICATION

A modified form of tape cutting means is shown in FIG. 4 which includes support 50 mounting upright stationary anvil 52. Elongated housing 54 secured on said support has a longitudinal bore to slidably receive reciprocal cutter bar 56. Said bar has a cutting edge 58 at one end normally spaced from anvil 52 and the transversely arranged edgewise extending tape 60 adapted to be cut at timed intervals. Suitable means are provided for feeding the tape between said anvil and cutting edge.

Solenoid 62 mounted upon said support includes a spring biased normally extended plunger 64, there being a suitable linkage means transmitting longitudinal movement in one direction of plunger 64 into longitudinal movement in the opposite direction of cutter bar 56. For this purpose there is provided a linkage assembly 66 pivotally mounted at 67 upon the support and at one end at 68 pivotally connected to plunger 64, and at its opposite end at 70, loosely connected as at 72 to cutter bar 56. A groove 72 in the cutter bar allows for over travel to obtain proper impact of the cutting edge with respect to the anvil and the tape 60 interposed therebetween.

Now having described the invention hereof, reference should be had to the claims which follow.

What is claimed is:

1. Tape cutting means comprising a vertically mounted stationary cutting edge means, and a vertically mounted horizontally movable anvil bar;

the anvil bar comprising a vertically positioned bar pivotally mounted on a horizontal axis at its lower end; and having an anvil insert at its upper end for cooperation with the cutting edge means;

means for passing a tape edgewise and horizontally across the cutting edge means between it and the anvil insert;

a strong spring for biasing the anvil bar upper end away from the cutting edge means;

a solenoid plunger spring actuating means for biasing the anvil bar upper end towards the cutting edge means in opposition to the strong spring;

a support for mounting the cutting edge means, the anvil bar, the strong spring, and the actuating means; and a table above and mounting the support and having a slot for the anvil bar in its movement.

2. Tape cutting means according to claim 1 wherein the cutting edge means is a cube having 12 edges; and having vertical and horizontal holes through it, enabling a bolt passed through either hole to mount the cube in a manner to present any one of its 12 edges to a cooperating anvil insert alternatively as desired.

3. A tape cutting means comprising a normally spaced apart anvil and cutting edge means;

means for passing a tape edgewise across the cutting edge means and spaced between said anvil and cutting edge means;

a solenoid actuated plunger;

means interconnecting the free end of said plunger with one of said anvil and cutting edge means for effecting a forceful relative operative engagement of one with respect to the other thereof, to sever the tape therebetween;

and a support for mounting said anvil and cutting edge means, said cutting edge means being stationary;

said anvil including an anvil bar at one end pivoted upon said support and adjacent its other end mounting an anvil insert, a compression spring interposed between said support and anvil bar;

said cutting edge means including a cube having 12 edges; having vertical and horizontal holes through it, enabling a bolt to pass through either hole to mount the cube upon said support in a manner to present any one of its 12 edges to the cooperating anvil insert alternately.

* * * * *